United States Patent
Gotou

(10) Patent No.: US 9,510,313 B2
(45) Date of Patent: Nov. 29, 2016

(54) MOBILE STATION, METHOD FOR CONTROLLING MOBILE STATION, MOBILE COMMUNICATION SYSTEM, MOBILITY MANAGEMENT APPARATUS, AND COMPUTER-READABLE MEDIUM

(71) Applicant: Kouhei Gotou, Tokyo (JP)

(72) Inventor: Kouhei Gotou, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/374,638

(22) PCT Filed: Oct. 25, 2012

(86) PCT No.: PCT/JP2012/006855
§ 371 (c)(1),
(2) Date: Jul. 25, 2014

(87) PCT Pub. No.: WO2013/111217
PCT Pub. Date: Aug. 1, 2013

(65) Prior Publication Data
US 2015/0050924 A1 Feb. 19, 2015

(30) Foreign Application Priority Data
Jan. 26, 2012 (JP) ................. 2012-014020

(51) Int. Cl.
*H04W 60/00* (2009.01)
*H04W 8/18* (2009.01)
(Continued)

(52) U.S. Cl.
CPC ............ *H04W 60/00* (2013.01); *H04W 8/18* (2013.01); *H04W 36/14* (2013.01); *H04W 60/005* (2013.01); *H04W 88/02* (2013.01); *H04W 88/06* (2013.01)

(58) Field of Classification Search
CPC ... H04W 8/18; H04W 36/14; H04W 60/005; H04W 88/02; H04W 60/00
USPC ............ 455/418, 422.1, 435.2; 370/331, 338
See application file for complete search history.

(56) References Cited

U.S. PATENT DOCUMENTS

2004/0044887 A1 3/2004 Park et al.
2012/0258704 A1* 10/2012 Kim et al. ................. 455/422.1

FOREIGN PATENT DOCUMENTS

| JP | 2004-096707 | 3/2004 |
| JP | 2011-527537 | 10/2011 |
| WO | WO 2011/136053 A1 | 11/2011 |

OTHER PUBLICATIONS

3GPP TSG-RAN5 Meeting #52, R5-113805, Change Request, 36.523-1 CR CRNum rev—9.5.0, Aug. 2011.
(Continued)

*Primary Examiner* — Phuoc H Doan
(74) *Attorney, Agent, or Firm* — Finnegan, Henderson, Farabow, Garrett & Dunner LLP

(57) ABSTRACT

In one embodiment, a mobile station (1) is capable of performing location registration procedures with first and second mobile management units (31 and 32) that respectively correspond to first and second RANs (Radio Access Networks). Further, the mobile station (1) supports ISR (Idle mode Signalling reduction) for reducing location registration procedures caused by reselection between the first RAN (21) and the second RAN (22). Furthermore, the mobile station (1) is configured to deactivate ISR in the mobile station (1) when voice service configuration information stored in the mobile station (1) is updated when the ISR is activated.

20 Claims, 8 Drawing Sheets

(51) Int. Cl.
    H04W 36/14    (2009.01)
    H04W 88/02    (2009.01)
    H04W 88/06    (2009.01)

(56) References Cited

OTHER PUBLICATIONS

3GPP TS 23.401 V11.0.0, "General Packet Radio Service (GPRS) enhancements for Evolved Universal Terrestrial Radio Access Network (E-UTRAN) access", 3GPP ($3^{rd}$ Generation Partnership Project), Dec. 2011.

3GPP TS 24.301 V11.1.0, "Non-Access-Stratum (NAS) protocol for Evolved Packet System (EPS); Stage 3", 3GPP ($3^{rd}$ Generation Partnership Project), Dec. 2011.

3GPP TS 24.008 V11.1.2, "Mobile radio interface Layer 3 specification; Core network protocols; Stage 3", 3GPP ($3^{rd}$ Generation Partnership Project), Jan. 2012.

International Search Report mailed Dec. 4, 2012.

ETSI TS 123 216 V10.1.0, "Digital cellular telecommunications system (Phase 2+); Universal Mobile Telecommunications System (UMTS)"; LTE; Single Radio Voice Call Continuity (SRVCC); Stage 2 (3GPP TS 23.216 versioin 10.1.0 Release 10), pp. 1-44, Jun. 2011.

ETSI TS 123 401 V 10.5.0, LTE; "General Packet Radio Service (GPRS) enhancements for Evolved Universal Terrestrial Radio Access Network (E-UTRAN) access", (3GPP TS 23.401 V10.5.0 Release 10), pp. 1-283, Oct. 2011.

Extended European Search Report mailed Oct. 5, 2015 by the European Patent Office in counterpart European Patent Application No. 12866583.3.

* cited by examiner

MOBILE STATION, METHOD FOR CONTROLLING MOBILE STATION, MOBILE COMMUNICATION SYSTEM, MOBILITY MANAGEMENT APPARATUS, AND COMPUTER-READABLE MEDIUM

CROSS-REFERENCE TO RELATED PATENT APPLICATIONS

This application is a National Stage Entry of International Application No. PCT/JP2012/006855, filed Oct. 25, 2012, which claims priority from Japanese Patent Application No. 2012-014020, filed Jan. 26, 2012. The entire contents of the above-referenced applications are expressly incorporated herein by reference.

TECHNICAL FIELD

The present invention relates to a location registration procedure for a mobile station.

BACKGROUND ART

3GPP (3rd Generation Partnership Project) specifications define the function for reducing location registration procedures when a mobile station makes reselection between different RANs (Radio Access Networks) provided by different RATs (Radio Access Technologies). This function is referred to as ISR (Idle mode Signalling Reduction).

RAN covers a geographical area divided into a plurality of cells or sectors. Each cell or sector is provided by a base station. Specific examples of RAN include UTRAN (Universal Terrestrial Radio Access Network), GERAN (GSM EDGE Radio Access Network) and E-UTRAN (Evolved Universal Terrestrial Radio Access Network). A base station is referred to as NodeB, BTS (Base Transceiver Station) or eNodeB, for example. Further, a mobile station is referred to as UE (User Equipment) or MS (Mobile Station), for example.

The term "RAT" is used as synonymous with RAN in some cases; however, it is a concept that includes not only RAN but also a mobility management node or entity placed in a core network in general. Specific examples of RAT include UTRA (Universal Terrestrial Radio Access) and E-UTRA (Evolved Universal Terrestrial Radio Access). E-UTRA is also called LTE (Long Term Evolution) in some cases. A mobility management node or entity in UTRA is SGSN (Serving GPRS Support Node). A mobility management node or entity in E-UTRA is MME (Mobility Management Entity).

Typically, the ISR can reduce signalling of location registration procedures when a mobile station in the idle state makes cell reselection between different RATs. The idle state (or idle mode) generally means the following state. Specifically, in the idle state, a mobile station is attached to a core network, and both of the mobile station and the mobility management node (or entity) have MM contexts (or MM parameters). However, a NAS (Non Access Stratum) message is not sent and received between the mobile station and the mobility management node, and dedicated radio resources in the RAN are not allocated for the mobile station. The core network keeps track of the location of the mobile station in units of location registration area. The location registration area is called RA (Routing Area) in UTRA and called TA (Tracking Area) in E-UTRA. Note that, in E-UTRA, the mobile station can belong to a plurality of TAs. In this case, the mobility management node (i.e., MME) keeps track of the location of the mobile station in units of TA list. The TA list can contain a plurality of TAs. Specific examples of idle state include ECM (EPS Connection Management)-IDLE state in E-UTRAN, PMM (Packet Mobility Management)-IDLE state in UTRAN and GPRS-STANDBY state in GERAN. Further, specific examples of idle state may include at least one of RRC_IDLE state in E-UTRAN, CELL_PCH state and URA_PCH state in UTRAN, and Packet Idle state in GERAN.

When the mobile station frequently makes reselection between different RANs, e.g., between E-UTRAN and GERAN/UTRAN, a location registration procedure is executed each time. The location registration procedure is referred to as a location update procedure in some cases. The location registration procedure in E-UTRAN is TAU (Tracking Area Update). The location registration procedure in GERAN/UTRAN is RAU (Routing Area Update). The location registration procedure involves signalling between the mobile station and the mobility management node located in the core network and signalling in the core network. Signalling in the core network includes, for example, signalling between the mobility management node and a subscriber server (e.g., HSS (Home Subscriber Server), HLR (Home Location Register)). Accordingly, frequent location registration procedures cause an increase in network load.

The ISR aims at reducing the location registration procedures caused by reselection between different RANs (Radio Access Networks). Currently, 3GPP defines ISR for reselection by the mobile station between E-UTRAN and GERAN/UTRAN. When the ISR is activated, the mobile station is registered in both of the two mobility management nodes (or entities) corresponding to two RANs (or RATs). To be specific, the mobile station is registered in both of the MME and the SGSN. Further, the mobile station has both of the MM (Mobility Management) contexts received from the SGSN and the MM contexts received from the MME. The MM contexts from the SGSN contain P-TMSI (Packet-Temporary Mobile Subscriber Identity) and RAI (Routing Area Identity), for example. The P-TMSI is a temporary identifier assigned to the mobile station by the SGSN. The MM contexts from the MME contain GUTI (Globally Unique Temporary Identity) and TAI (Tracking Area Identity), for example. The GUTI is a temporary identifier assigned to the mobile station by the MME. When the ISR is activated, the mobile station can make reselection between two RANs (i.e. GERAN/UTRAN and E-UTRAN) without performing a location registration procedure (i.e., RAU, TAU) unless it moves out of the two location registration areas (i.e. RA and TA(s)) registered in the network.

The ISR is activated in the following procedure, for example. First, the mobile station performs initial attach through either one of two RANs, i.e., through GERAN/UTRAN or E-UTRAN in this example. Here it is considered that the mobile station performs initial attach through E-UTRAN. In the initial attach, the mobile station performs a location registration procedure with the MME, and the mobile station is registered in the MME. The mobile station enters ECM-IDLE state.

Next, when the mobile station first reselects GERAN/UTRAN, the mobile station initiates a location registration procedure (i.e., RAU). Specifically, the mobile station sends a RAU request to the SGSN. The RAU request contains P-TMSI mapped from GUTI. The SGSN sends a context request to the MME specified from the received GUTI. The SGSN thereby sends the MM contexts (e.g., P-TMSI, RA) of the mobile station managed by itself to the MME, and receives the MM contexts (e.g., GUTI, TA(s)) from the MME. Then, the SGSN sends a RAU accept. The RAU accept carries the MM contexts (e.g., P-TMSI, RA) and indicates "ISR activated".

Upon receiving the RAU accept indicating "ISR activated", the mobile station activates the ISR in the own station. To be specific, the mobile station sets its TIN (Temporary Identity used in Next update) to "RAT-related TMSI". The TIN is one of the MM contexts held by the mobile station. The TIN defines the identifier of the mobile station to be presented by the mobile station in the next location registration procedure, i.e., RAU request, TAU request or attach request. As a result of setting the TIN to "RAT-related TMSI", the ISR operation in the mobile station is started.

For overview of the ISR, refer to §4.3.5.6 "Idle mode signalling reduction function" and Annex J "High Level ISR description" in Non Patent Literature 1 (3GPP TS 23.401). The ISR is also described in Non Patent Literature 2 (3GPP TS 24.301) and Non Patent Literature 3 (3GPP TS 24.008).

Further, 3GPP specifications define a plurality of methods such as CS Fallback and IMS Voice (Voice over IP) to provide a voice service to the mobile station in E-UTRA. In relation to this, the network (e.g., MME) can indicate which RAN (or RAT) is to be selected preferentially when the mobile station that supports the voice service selects a cell. For example, "UE's usage setting" and "Voice domain preference for E-UTRAN" that are sent from the mobile station to the network may be used as an index to determine the RAN (or RAT) to be selected preferentially. The "UE's usage setting" and "Voice domain preference for E-UTRAN" are stored in the mobile station and sent to the mobility management node (i.e., MME, SGSN) by TAU request, RAU request and attach request.

The "UE's usage setting" indicates whether the mobile station behaves in "a voice centric" or "a data centric". The "Voice domain preference for E-UTRAN" indicates whether the mobile station supports CS (Circuit Switched) voice or PS (Packet Switched) voice and indicates which one of CS voice and PS voice is more preferred. To be specific, the "Voice domain preference for E-UTRAN" indicates the mobile station is configured as "CS Voice only", "CS Voice preferred and IMS PS Voice as secondary", "IMS PS Voice preferred and CS Voice as secondary" or "IMS PS Voice only".

For overview of the "UE's usage setting" and "Voice domain preference for E-UTRAN", refer to §4.3.5.9 "Voice domain preference and UE's usage setting" and §4.3.6 "Radio Resource Management functions" in Non Patent Literature 1 (3GPP TS 23.401), for example. The "UE's usage setting" and "Voice domain preference for E-UTRAN" are also described by Non Patent Literature 2 (3GPP TS 24.301) in §3.1 "Definitions", §4.3 "UE mode of operation", §5.5.3.2.2 "Normal and periodic tracking area updating procedure initiation", §5.5.3.3.2 "Combined tracking area updating procedure initiation" and the like. Further, they are described also by Non Patent Literature 3 (3GPP TS 24.008) in §4.7.5.1 "Normal and periodic routing area updating procedure", §4.7.5.2.1 "Combined routing area updating procedure initiation" and the like.

In this specification, the term "voice service configuration information" is defined as information that is related to the priority of a voice service stored in the mobile station and that is sent from the mobile station to the network and used in the network as an index for selecting RAN (or RAT) which provides a voice service to the mobile station, such as the above-described "UE's usage setting" and "Voice domain preference for E-UTRAN".

CITATION LIST

Non Patent Literature

[Non Patent Literature 1] 3GPP TS 23.401 V11.0.0 (2011-12), "General Packet Radio Service (GPRS) enhancements for Evolved Universal Terrestrial Radio Access Network (E-UTRAN) access", 3GPP (3rd Generation Partnership Project, December 2011

[Non Patent Literature 2] 3GPP TS 24.301 V11.1.0 (2011-12), "Non-Access-Stratum (NAS) protocol for Evolved Packet System (EPS); Stage 3", 3GPP (3rd Generation Partnership Project), December 2011

[Non Patent Literature 3] 3GPP TS 24.008 V11.1.2 (2012-01), "Mobile radio interface Layer 3 specification; Core network protocols; Stage 3", 3GPP (3rd Generation Partnership Project), January 2012

SUMMARY OF INVENTION

Technical Problem

When the voice service configuration information such as the above-described "UE's usage setting" and "Voice domain preference for E-UTRAN" are updated in the mobile station, the mobile station performs a location registration procedure with the mobility management node (e.g., MME or SGSN) corresponding to the currently selected RAN, thereby informing the mobility management node about the update of the voice service configuration information. To be specific, the mobile station sends a TAU request or a RAN request indicating the update of the voice service configuration information. The mobility management node corresponding to the currently selected RAN can thereby recognize the update of the voice service configuration information.

However, the update of the voice service configuration information, such as the above-described "UE's usage setting" and "Voice domain preference for E-UTRAN" in the mobile station, is not used as a trigger for deactivation of the ISR. Accordingly, when the ISR is activated, the mobile station does not initiate the location registration procedure during reselection of RAN that is performed after the update of the voice service configuration information. Therefore, the mobility management node corresponding to the reselected RAN cannot recognize the update of the voice service configuration information. This means that selection of RAN (or RAT) different from the expectation of the mobile station may occur at the reselected RAN. For example, there is a possibility that the mobile station is forced to move to other RAN without conforming to the priority assumed from the updated voice service configuration information.

That is, when the voice service configuration information stored in the mobile station is updated when the ISR is activated, discrepancy in the contents of the voice service configuration information can arise between mobility management nodes (e.g., MME and SGSN) where the ISR is activated.

The present invention has been accomplished based on the above-described finding by the present inventor and an object of the present invention is thus to provide a mobile station, a method for controlling a mobile station, a mobile communication system, a mobility management apparatus, and a program that can contribute to solve the problem of discrepancy in the contents of the voice service configuration information described above.

Solution to Problem

A first aspect includes a mobile station. The mobile station includes a communication control unit. The communication control unit is capable of performing location registration procedures with first and second mobility management units respectively corresponding to first and second RANs (Radio Access Networks) and supports ISR (Idle mode Signalling Reduction) for reducing location registration procedures caused by reselection between the first and second RANs by the mobile station. Further, when voice service setting information stored in the mobile station is updated when the ISR is activated, the communication control unit deactivates the ISR in the mobile station.

A second aspect includes a method for controlling a mobile station that can be registered in both of first and second mobility management units respectively corresponding to first and second RANs (Radio Access Networks) and supports ISR (Idle mode Signalling Reduction) for reducing location registration procedures caused by reselection between the first and second RANs. The method includes, when voice service configuration information stored in the mobile station is updated when the ISR is activated, deactivating the ISR in the mobile station.

A third aspect includes a mobile communication system. The mobile communication system includes first and second mobility management units respectively corresponding to first and second RANs and a mobile station. The mobile station is capable of performing location registration procedures with the first and second mobility management units and supports ISR (Idle mode Signalling Reduction) for reducing location registration procedures caused by reselection between the first and second RANs by the mobile station. Further, the mobile station is configured to deactivate the ISR in the mobile station when voice service configuration information stored in the mobile station is updated when the ISR is activated.

A fourth aspect includes a mobility management apparatus. The mobility management apparatus supports ISR (Idle mode Signalling Reduction) for reducing location registration procedures caused by reselection between first and second RANs by a mobile station. The mobility management apparatus includes an ISR control unit that sends a location registration response indicating deactivation of the ISR to the mobile station in response to receiving, from the mobile station when the ISR is activated, a location registration request indicating update of voice service configuration information stored in the mobile station.

A fifth aspect includes a program that causes a computer to perform the method according to the second aspect described above.

Advantageous Effects of Invention

According to the above-described aspects, it is possible to provide a mobile station, a method for controlling a mobile station, a mobile communication system, a mobility management apparatus, and a program that can contribute to solve the problem of discrepancy in the contents of the voice service configuration information described above.

DESCRIPTION OF EMBODIMENTS

Specific embodiments of the present invention will be described hereinafter in detail with reference to the drawings. It is noted that in the description of the drawings, the same elements will be denoted by the same reference symbols and redundant description will be omitted to clarify the explanation.

First Embodiment

Figure 1:
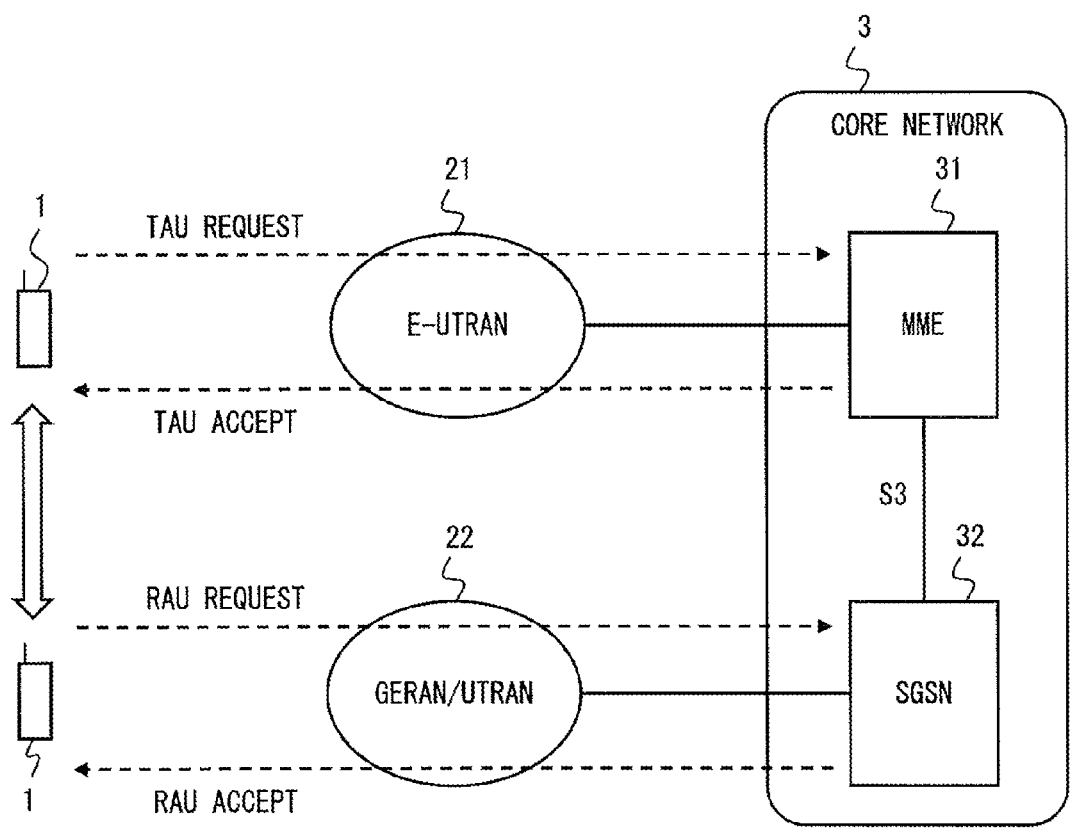
FIG. 1 is a diagram showing a configuration example of a mobile communication system according to a first embodiment.

FIG. 1 shows a configuration example of a mobile communication system according to this embodiment. This embodiment describes a combined system of 3GPP UMTS and EPS (Evolved Packet System). In other words, the mobile communication system according to this embodiment provides different RANs (i.e., an E-UTRAN 21 and a GERAN/UTRAN 22) and supports the above-described ISR (Idle mode Signalling Reduction).

In the example of FIG. 1, the mobile communication system includes a core network 3 and a mobile station 1. The core network 3 includes an MME 31 and an SGSN 32. The MME 31 is a mobility management node (or entity) corresponding to the E-UTRAN 22. The SGSN 32 is a mobility management node (or entity) corresponding to the GERAN/UTRAN 22. Note that, this embodiment mainly describes the control plane functions, i.e., mobility management and the ISR for the mobile station 1. Thus, the SGSN 32 of FIG. 1 may have the control plane functions only. The MME 31 and the SGSN 32 both support the ISR, and can send and receive a context related to the mobile station 1 containing the voice service configuration information received from the mobile station 1 with each other, thereby synchronizing the contexts with each other. Signalling for sending and receiving the context may be performed using an interface (i.e., S3 Interface) available between the MME 31 and the SGSN 32.

As already indicated above, the voice service configuration information is information that is related to the priority of a voice service stored in the mobile station 1 and that is sent from the mobile station 1 to the core network 3 and used in the core network 3 as an index for selecting RAN (or RAT) which provides a voice service to the mobile station 1. The voice service configuration information includes, for example, at least one of the above-described "UE's usage setting" and "Voice domain preference for E-UTRAN".

Although not shown in FIG. 1, the core network 3 may include a transfer node (or entity) in a user plane as a matter of course. The transfer node (or entity) performs transfer (e.g., routing or forwarding) of user data. The core network 3 may include a plurality of transfer nodes (or entities). In the case of EPS, the transfer node (or entity) includes an S-GW (Serving Gateway) and a P-GW (Packet Data Network Gateway). In the case of UMTS, the transfer node (or entity) includes the user plane function of an SGSN and the user plane function of a GGSN (Gateway GPRS Support Node). Thus, the core network 3 may include an EPC (Evolved Packet Core) corresponding to LTE and a GPRS (General Packet Radio Service) packet core for UMTS.

The mobile station 1 is a dual mode terminal that supports a plurality of RATs, which are E-UTRA and UTRA in this example. In other words, the mobile station 1 is capable of establishing a connection to the E-UTRAN 21 through LTE wireless access and a connection to the GERAN/UTRAN 22 through 2G/3G wireless access. The mobile station 1 in the idle state (e.g., ECM-IDLE state, PMM-IDLE state or GPRS-STANDBY state) can make reselection (cell reselection) between the E-UTRAN 21 and the GERAN/UTRAN 22. When selecting the E-UTRAN 21, the mobile station 1 performs TAU procedure as the location registration procedure. On the other hand, when selecting the GERAN/UTRAN 22, the mobile station 1 performs RAU procedure as the location registration procedure. The TAU procedure includes sending a TAU request from the mobile station 1 to the MME 31 and sending a TAU accept from the MME 31 to the mobile station 1. On the other hand, the RAU procedure includes sending a RAU request from the mobile station 1 to the SGSN 32 and sending a RAU accept from the SGSN 32 to the mobile station 1.

The mobile station 1 supports the ISR for reducing signalling related to those location registration procedures. Specifically, when the ISR is activated after the mobile station 1 is registered in both of the MME 31 and the SGSN 32, the mobile station can make reselection between two RANs (i.e., the E-UTRAN 21 and the GERAN/UTRAN 22) without performing the a location registration procedure (i.e., RAU, TAU) unless it moves out of the two location registration areas (i.e., RA and TA(s)) registered in the network.

Note that, however, the mobile station 1 according to the first embodiment is configured to deactivate the ISR in the mobile station 1 when the voice service configuration information stored in the mobile station 1 is updated when the ISR is activated. The ISR deactivation in the mobile station 1 may be local ISR deactivation in the mobile station 1. In other words, even when an instruction from the network (i.e., the MME 31 and the SGSN 32) indicates "ISR activated", the mobile station 1 may spontaneously and locally deactivate the ISR in the mobile station 1 without depending on the instruction from the network.

The local ISR deactivation in the mobile station 1 is done by changing the TIN (Temporary Identity used in Next update) from "RAT-related TMSI" to GUTI or P-TMSI. Whether the TIN is set to GUTI or P-TMSI is determined according to the RAN selected by the mobile station 1. To be specific, when the mobile station 1 selects the E-UTRAN 21, the mobile station 1 sets the TIN to GUTI for ISR deactivation. On the other hand, when the mobile station 1 selects the GERAN/UTRAN 22, the mobile station 1 sets the TIN to P-TMSI for ISR deactivation.

Further, instead of spontaneous and local ISR deactivation by the mobile station 1, the ISR deactivation in the mobile station 1 caused by updating the voice service configuration information may be performed according to an instruction for deactivation from the MME 31 or the SGSN 32. This example is described in detail in the second embodiment below.

With the spontaneous and local ISR deactivation by the mobile station 1, there is an advantage that it is possible to solve the problem of discrepancy in the contents of the voice service configuration information without adding new functions to the mobility management nodes (or entities) on the network side, i.e., the MME 31 and the SGSN 32. The MME 31 and the SGSN 32 only need to perform the normal ISR operation specified in the current 3GPP specifications. On the other hand, in the case of performing ISR deactivation in the mobile station 1 according to an instruction for deactivation from the MME 31 or the SGSN 32, there is an advantage that it is possible to solve the problem of discrepancy in the contents of the voice service configuration information without adding new functions to the mobile station 1. The mobile station 1 only needs to deactivate the ISR state of itself in accordance with the normal ISR operation specified in the current 3GPP specifications.

The ISR deactivation in the mobile station 1 causes the mobile station to perform the location registration procedure (i.e., TAU or RAU) with one of the MME 31 and the SGSN 32 corresponding to a RAN to which the mobile station 1 moves during reselection of RAN that is performed after the update of the voice service configuration information. This is because, as a result that the ISR is deactivated, the mobile station 1 cannot skip the location registration procedure and has to perform the location registration procedure (i.e., TAU or RAU) with one of the MME 31 and the SGSN 32 corresponding to the reselected RAN to which the mobile stations moves.

Hereinafter, a scheme that the updated content of the voice service configuration information in the mobile station 1 is synchronized between the MME 31 and the SGSN 32 by the ISR deactivation in the mobile station 1 is described. The synchronization can be achieved by any of the following two examples:
(Example 1) Exchanging a context between the MME 31 and the SGSN 32, or
(Example 2) Sending, from the mobile station 1 to both of the MME 31 and the SGSN 32, a notification of the update of the voice service configuration information.

Those two examples are sequentially described below.

EXAMPLE 1

The example 1 corresponds to the case where the mobile station 1 actually deactivates the ISR in an explicit manner and informs the MME 31 or the SGSN 32 about the ISR deactivation. To be specific, the mobile station 1 locally deactivates the ISR by actually changing the TIN from "RAT-related TMSI" to GUTI or P-TMSI. The mobile station 1 thereby performs a location registration procedure with the mobility management node (e.g., the MME 31) corresponding to the RAN to be reselected (the RAN to which it moves) during RAN reselection that is performed after the ISR deactivation in the mobile station 1. In this location registration procedure, the mobile station 1 sends a location registration request (e.g., a TAU request) indicating ISR deactivated. The ISR deactivated is indicated by the fact that a temporary identifier (TMSI) of the mobile station 1 contained in the TAU request and the RAU request is GUTI or P-TMSI, not "RAT-related TMSI". According to a normal procedure when ISR is deactivated, the mobility management node (e.g., the MME 31), which has received the location registration request indicating that the ISR is deactivated in the mobile station 1, requests a context related to the mobile station 1 to the other mobility management node (e.g., the SGSN 32) and receives it from the other mobility management node. Thus, the context related to the mobile station 1 containing the voice service configuration information is resynchronized between the MME 31 and the SGSN 32.

Note that, as is already described earlier, the mobile station 1 has performed a location registration procedure with the mobility management node (e.g., the SGSN 32) corresponding to the RAN before reselection (the RAN from which it moves) prior to the location registration procedure and the context resynchronization after the RAN reselection described above. Specifically, when the voice service configuration information is updated in the mobile station 1 when the ISR is activated, the mobile station 1 performs a location registration procedure with the mobility management node (e.g., the SGSN 32) corresponding to the currently selected RAN. The mobility management node (e.g., the SGSN 32) is thereby notified of the update of the voice service configuration information.

Accordingly, in the example 1, the context containing the updated voice service configuration information that has been sent to one mobility management node (e.g., the SGSN 32) in advance is transferred to the other mobility management node (e.g., the MME 31), triggered by the location registration request after ISR deactivation. The updated content of the voice service configuration information in the mobile station 1 is thereby synchronized between the MME 31 and the SGSN 32.

EXAMPLE 2

The example 2 corresponds to the case where the mobile station 1 does not inform the MME 31 and the SGSN 32 about ISR deactivation. Stated differently, the mobile station 1 deactivates the ISR in an implicit manner. In this case, the mobile station 1 does not need to explicitly perform local ISR deactivation. The mobile station 1 thereby does not need to change the TIN. In the example 2, the mobile station 1 informs both of the MME 31 and the SGSN 32 about the update of the voice service configuration information. To be more specific, the mobile station 1 may send a location registration request indicating the update of the voice service configuration information to both of the MME 31 and the SGSN 32.

As is already described earlier, when the voice service configuration information is updated in the mobile station 1 when the ISR is activated, the mobile station 1 performs a location registration procedure with the mobility management node (e.g., the SGSN 32) corresponding to the currently selected RAN. The mobility management node (e.g., the SGSN 32) is thereby notified of the update of the voice service configuration information. To be specific, the mobile station 1 sends a location registration request (e.g., a RAU request) indicating the update of the voice service configuration information. The mobility management node (e.g., the SGSN 32) corresponding to the currently selected RAN can thereby recognize the update of the voice service configuration information.

Further, in the example 2, the mobile station 1 sends a location registration request indicating the update of the voice service configuration information also to the mobility management node (e.g., the MME 31) corresponding to the RAN to be reselected (the RAN to which it moves). The mobility management node (e.g., the MME 31) corresponding to the RAN to be reselected (the RAN to which it moves) can thereby also recognize the update of the voice service configuration information. Accordingly, the updated content of the voice service configuration information in the mobile station 1 is synchronized between the MME 31 and the SGSN 32.

The example 2 is significant in that the mobile station 1 does not need to inform the network (the MME 31 and the SGSN 32) about ISR deactivation. Further, the MME 31 and the SGSN 32 can synchronize the updated content of the voice service configuration information in the mobile station 1 with each other without signalling for context resynchronization. Note that, however, the example 1 has an advantage that the impact of a specification change is smaller compared to the example 2. This is because, in the example 2, the mobile station 1 is requested to perform an operation which is different from local ISR activation/deactivation in the mobile station that is specified in the current 3GPP specifications.

As described above, when the voice service configuration information stored in the mobile station 1 is updated when the ISR is activated, the mobile station 1 deactivates the ISR in the mobile station 1. By the ISR deactivation, a location registration procedure is performed between the mobile station 1 and the mobility management node (e.g., the MME 31 or the SGSN 32) corresponding to a RAN to which the mobile station 1 moves, at the time of RAN reselection that is performed after the update of the voice service configuration information. Then, based on the location registration procedure, the updated content of the voice service configuration information in the mobile station 1 is synchronized between the MME 31 and the SGSN 32. As described above, the synchronization of the updated voice service configuration information between the MME 31 and the SGSN 32 may be achieved by context synchronization between the MME 31 and the SGSN 32 which is triggered by the location registration procedure between the mobile station 1 and the mobility management node to which it moves. Alternatively, the synchronization of the updated voice service configuration information between the MME 31 and the SGSN 32 may be achieved by sending a notification of the update of the voice service configuration information from the mobile station 1 during the location registration procedure between the mobile station 1 and the mobility management node to which it moves.

Figure 2:
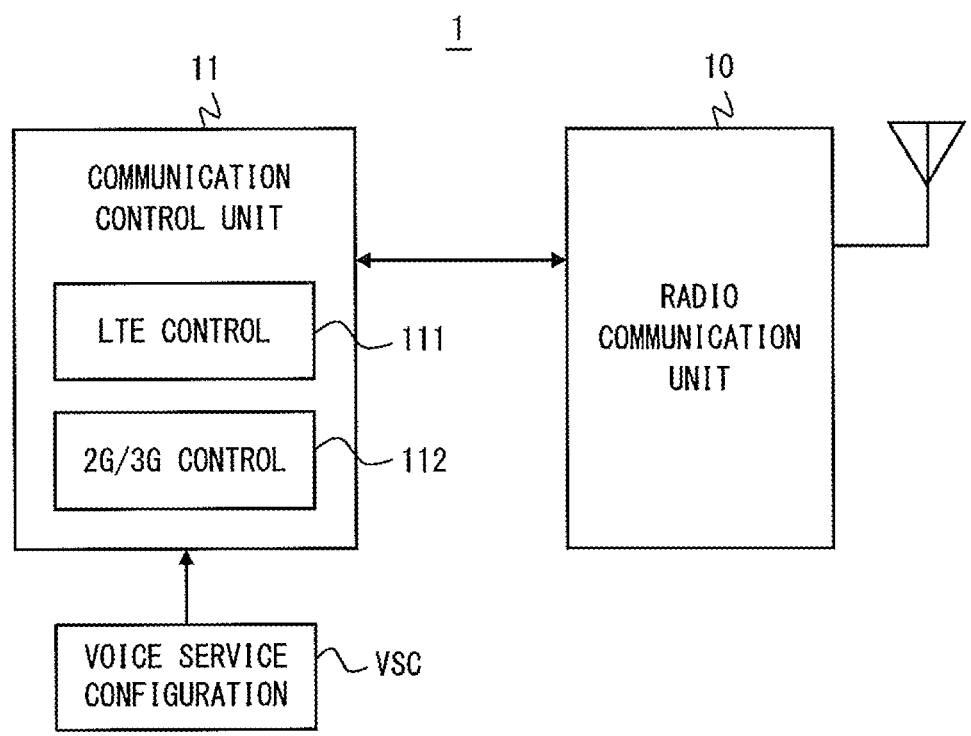
FIG. 2 is a block diagram showing a configuration example of a mobile station according to the first embodiment.

Hereinafter, a configuration example of the mobile station 1 is described. Further, an example of the procedure to synchronizing, between the MME 31 and the SGSN 32, the voice service configuration information updated in the mobile station 1 is described. FIG. 2 is a block diagram showing a configuration example of the mobile station 1. Note that FIG. 2 shows only the major components related to the location registration procedure, the ISR and the update of the voice service configuration information according to this embodiment.

The configuration example of FIG. 2 includes a radio communication unit 10 and a communication control unit 11. The radio communication unit 10 is capable of connecting to a plurality of RANs, which are the E-UTRAN 21 and the GERAN/UTRAN 22 in this example. The radio communication unit 10 receives a downlink signal containing a plurality of physical downlink channels from a base station included in the E-UTRAN 21 or the GERAN/UTRAN 22. Further, the radio communication unit 10 transmits an uplink signal containing a plurality of physical uplink channels to a base station.

The communication control unit 11 performs signalling with the E-UTRAN 21, the GERAN/UTRAN 22 and the core network 3 through the radio communication unit 10 and controls the radio communication unit 10 for sending and receiving control data and user data. Further, the communication control unit 11 performs digital baseband signal processing on the control data and user data. The digital baseband signal processing includes layer-2 signal processing and layer-1 (physical layer) signal processing. The layer-2 signal processing includes, for example, data compression/decompression and data segmentation/concatenation. The physical layer signal processing includes, for example, channel coding/decoding and modulation/demodulation.

In the example of FIG. 2, the communication control unit 11 includes an LTE control unit 111 and a 2G/3G control unit 112. The LTE control unit 111 performs communication control for connecting to LTE, i.e., the E-UTRAN 21 and the EPC (e.g., the MME 31). On the other hand, the 2G/3G control unit 112 performs communication control for connecting to UMTS, i.e., the GERAN/UTRAN 22 and the GPRS packet core (e.g., the SGSN 32).

The communication control unit 11 performs communication control including the location registration procedure, the processing related to the ISR and the update of the voice service configuration information described earlier. Thus, in the case where the voice service configuration information VSC stored in the mobile station 1 is updated when the ISR is activated, the communication control unit 11 deactivates the ISR in the mobile station 1.

The functions of the communication control unit 11 may be implemented using a semiconductor processing device including ASIC (Application Specific Integrated Circuit), DSP (Digital Signal Processor) and the like. Further, the functions of the communication control unit 11 may be implemented by causing a computer such as a microprocessor to execute a program. Furthermore, the functions of the communication control unit 11 may be implemented by any combination of ASIC, DSP and a microprocessor. For example, at least part of the digital baseband signal processing may be performed in a DSP, and the other processing (e.g., the location registration procedure, the processing related to the ISR and the update of the voice service configuration information) may be performed in a microprocessor.

As described above, at least some of the functions of the communication control unit 11 may be implemented by causing a computer such as a microprocessor to execute a program. The program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

Figure 3:
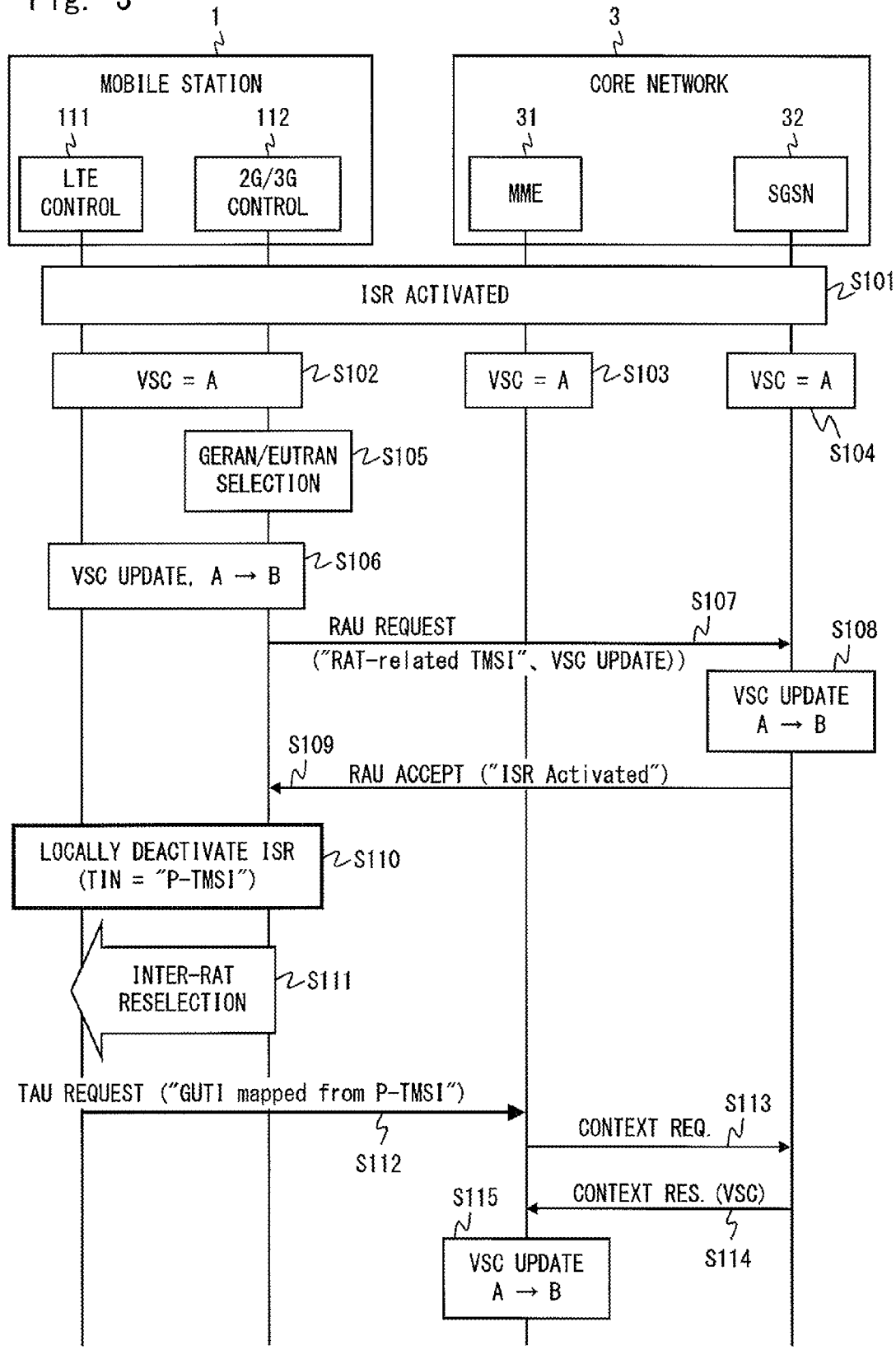
FIG. 3 is a sequence chart showing a relationship between update of voice service configuration information VSC and location registration procedure when ISR is activated according to the first embodiment.

FIG. 3 is a sequence chart showing one example of the procedure to achieve synchronization of the voice service configuration information VSC updated in the mobile station 1 between the MME 31 and the SGSN 32. The example of FIG. 3 begins with the state where the mobile station 1 is already registered in both of the MME 31 and the SGSN 32, and the ISR is activated (Step S101). Further, the mobile station 1, the MME 31 and the SGSN 32 store the same voice service configuration information VSC as a part of the context related to mobility management (Steps S102 to S105). It is assumed that the value of the voice service configuration information VSC is "A". The mobile station 1 in the idle state selects the GERAN/UTRAN 22 (Step S105).

In Step S106, the voice service configuration information VSC stored in the mobile station 1 is updated from the value "A" to the value "B" by an instruction from, for example, a user. In Step S107, the communication control unit 11 (i.e. the 2G/3G control unit 112) of the mobile station 1 sends a RAU request to the SGSN 32 corresponding to the currently selected GERAN/UTRAN 22. This RAU request contains a notification about the update of the voice service configuration information VSC. Upon receiving the RAU request, the SGSN 32 updates the voice service configuration information VSC stored for the mobile station 1 to the notified value "B" (Step S108). In Step S109, the SGSN 32 sends a RAU accept to the mobile station 1.

The RAU accept sent in Step S109 indicates whether the ISR is activated or not. In the example of FIG. 3, the RAU accept sent in Step S109 indicates "ISR activated". However, regardless of an instruction of the RAU accept, the mobile station 1 (i.e. the communication control unit 11) spontaneously deactivates the ISR in the mobile station 1 even when the RAU accept indicates "ISR activated" (Step S110). As is already described above, the spontaneous and local ISR deactivation in the mobile station 1 is achieved by changing the value of TIN from "RAT-related TMSI" to GUTI, for example, regardless of an instruction of the RAU accept.

Note that the ISR deactivation in the mobile station 1 is performed before or during RAN reselection occurring after the update of the voice service configuration information VSC. For example, the communication control unit 11 may deactivate the ISR in the mobile station 1 in response to receiving the RAU accept in Step S109, regardless of an instruction of the RAU accept, and continue the deactivated state until the next RAN selection. Alternatively, the communication control unit 11 may continue the ISR activated state, when receiving the RAU accept in Step S109, according to an instruction of the RAU accept. In this case, the communication control unit 11 may memorize the occurrence of the update of the voice service configuration information and deactivate the ISR in the mobile station 1 at the future RAN reselection.

In Step S111, the mobile station 1 (i.e., the communication control unit 11) in the idle state determines to move from the GERAN/UTRAN 22 to the E-UTRAN 21 (i.e., cell reselection). This cell reselection is Inter-RAT cell reselection. At this time, the ISR is deactivated in the mobile station 1. Thus, in Step S112, the communication control unit 11 (i.e., the LTE control unit 111) of the mobile station 1 sends a TAU request to the MME 31 corresponding to the E-UTRAN 21 to which it moves. This TAU request indicates that the ISR is deactivated in the mobile station 1. To be specific, a temporary identifier of the mobile station 1 contained in the TAU request is set to "GUTI mapped from P-TMSI".

Because the TAU request indicates ISR deactivated in the mobile station 1, the MME 31 carries out a procedure to restart the ISR with the SGSN 32 (Steps S113, S114). Specifically, the MME 31 sends a context request related to the mobile station 1 to the SGSN 32 and receives a context response from the SGSN 32. The context related to the mobile station 1 that is sent by the context response contains the updated voice service configuration information VSC (the value "B"). Thus, the MME 31 updates the voice service configuration information VSC for the mobile station 1, which have stored by the MME 31, to the notified value "B" (Step S115). The voice service configuration information VSC updated in the mobile station 1 is thereby synchronized between the MME 31 and the SGSN 32.

FIG. 3 shows the example where the voice service configuration information VSC is updated in the mobile station 1 when the GERAN/UTRAN 22 is selected, and then the mobile station 1 reselects the E-UTRAN 21 after that. On the contrary, in the case where the voice service configuration information VSC is updated in the mobile station 1 when the E-UTRAN 21 is selected, and then the mobile station 1 reselects the GERAN/UTRAN 22 also, the synchronization of the voice service configuration information VSC can be performed in the same procedure as shown in FIG. 3.

COMPARATIVE EXAMPLE

Figure 4:
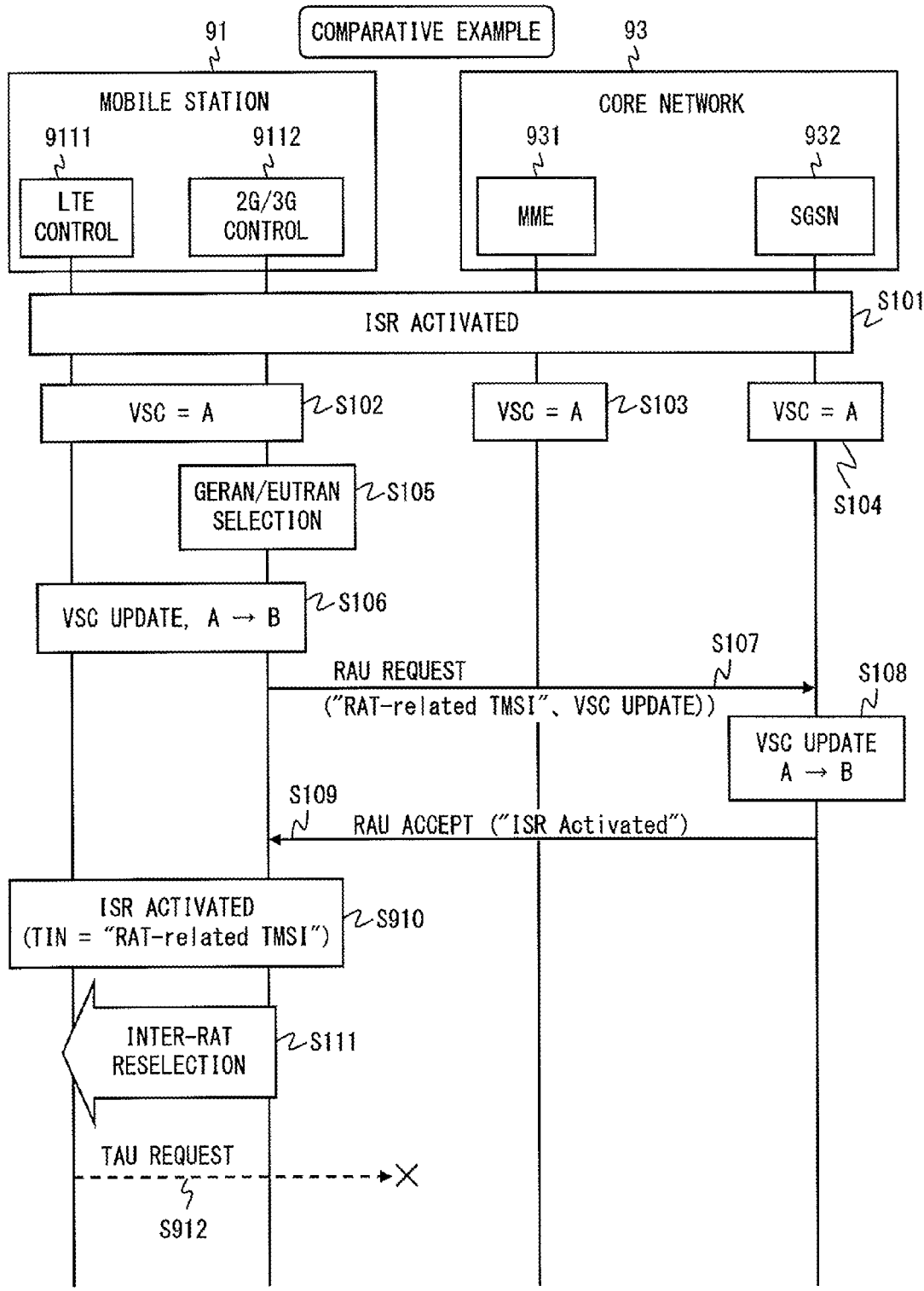
FIG. 4 is a sequence chart of a comparative example showing a relationship between update of voice service configuration information VSC and location registration procedure when the ISR is activated.

A comparative example is described hereinafter with reference to FIG. 4. FIG. 4 shows a procedure without performing an operation to deactivate the ISR in the mobile station 1 triggered by the update of the voice service configuration information when the ISR is activated. In FIG. 4, reference symbols for the mobile station and the core network are differentiated in order to clarify differences from this embodiment. The operations of a mobile station 91 (including a LTE control unit 9111 and a 2G/3G control unit 9112) and a core network 93 (including an MME 931 and an SGSN 932) in Steps S101 to S109 in FIG. 4 are the same as Steps S101 to S109 shown in FIG. 3.

However, in Step S910, the mobile station 91 maintains the ISR activated state according to an instruction of the RAU accept in Step S109. Specifically, the value of the TIN remains "RAT-related TMSI" which corresponds to ISR activated. Accordingly, when the E-UTRAN 21 is selected in Inter-RAT cell reselection in Step S111, the mobile station 91 does not initiate an operation to send a TAU request because the ISR is activated in the mobile station 91 (Step S912). Discrepancy in the contents of the voice service configuration information VSC thereby arises between the MME 31 and the SGSN 32.

If discrepancy in the contents of the voice service configuration information VSC arises between the MME 31 and the SGSN 32, the following disadvantage will occur. For example, one possible disadvantage is that the mobility management node (e.g., the MME 931), which has the voice service configuration information VSC before update, or a base station controlled by the mobility management node indicates the priority of the RAN (or RAT) to the mobile station 91 based on the voice service configuration information VSC before update. This can cause that the mobile station 91 is requested to select the RAN (or RAT) that is not suitable for the voice service configuration information VSC after update. As an example, despite that the mobile station 91 supports IMS Voice (Voice over IP), the mobile station 91 is instructed to preferentially select the GERAN/UTRAN 22, not the E-UTRAN 21. In this case, the mobile station 91 misses an opportunity to use a high-speed packet service by the LTE (the E-UTRAN 21 and the EPC).

Another possible disadvantage is that the MME 931 and the SGSN 932 where discrepancy arises indicate different priorities to the E-UTRAN 21 and the GERAN/UTRAN 22. This can cause that the mobile station 91 frequently repeats reselection between the E-UTRAN 21 and the GERAN/UTRAN 22. In this case, the mobile station 91 suffers from heavy battery consumption.

On the other hand, the embodiment described with reference to FIGS. 1 to 3 can prevent the occurrence of discrepancy in the contents of the voice service configuration information between the mobile station 1 and a plurality of mobility management nodes corresponding to different RATs (e.g., the MME 31 and the SGSN 32). Accordingly, it is possible to prevent the disadvantages assumed in the comparative example of FIG. 4.

Second Embodiment

The first embodiment describes several examples of the procedure to deactivate the ISR in the mobile station 1 in response to the update of the voice service configuration information in the mobile station 1. The second embodiment describes one of those examples in detail. To be specific, the second embodiment describes the example in which ISR deactivation in the mobile station 1 is performed in response to receiving an instruction for deactivation from the MME 31 or the SGSN 32. Note that the configuration of the mobile communication system according to the second embodiment may be the same as the configuration example shown in FIG. 1.

Figure 5:
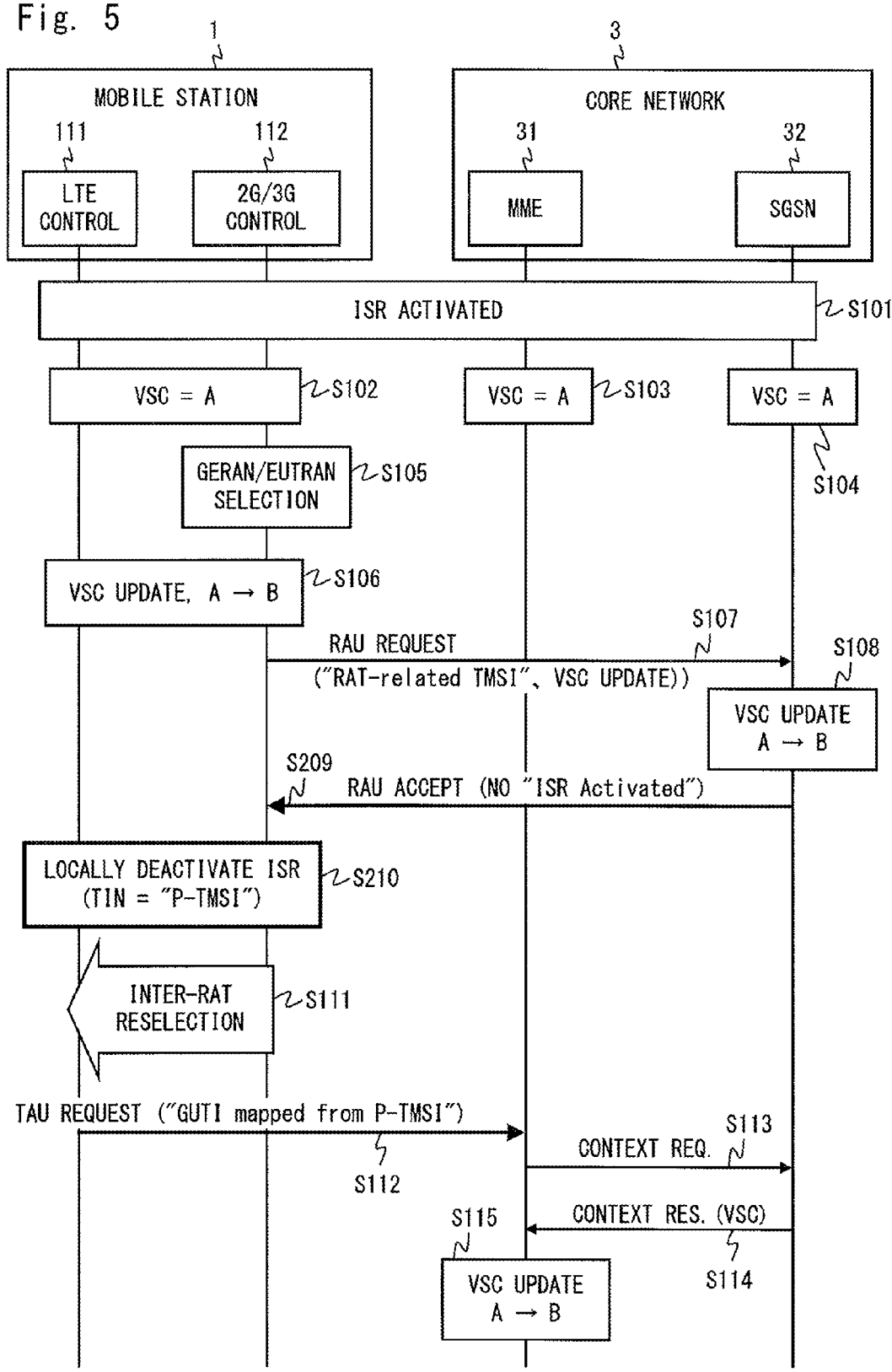
FIG. 5 is a sequence chart showing a relationship between update of voice service configuration information VSC and location registration procedure when the ISR is activated according to a second embodiment.

FIG. 5 is a sequence chart showing one example of the procedure to achieve synchronization of the voice service configuration information VSC updated in the mobile station 1 between the MME 31 and the SGSN 32. FIG. 5 is different from FIG. 3 in Steps S209 and S210.

In the example of FIG. 5, the SGSN 32, which has received a RAU request containing a notification about the update of the voice service configuration information VSC, determines that the ISR should be deactivated. Then, in Step S209, the SGSN 32 sends a RAU accept not containing an instruction of ISR activation (stated differently, a RAU accept indicating ISR deactivated) to the mobile station 1. In Step S210, the mobile station 1 deactivates the ISR in the mobile station 1 according to an instruction from the SGSN 32 indicated by the RAU accept.

Note that, the synchronization of the voice service configuration information VSC can be performed in the same procedure as shown in FIG. 5 also in the case where the voice service configuration information VSC is updated in the mobile station 1 when the E-UTRAN 21 is selected, and then the mobile station 1 reselects the GERAN/UTRAN 22 after that.

According to the example shown in FIG. 5, it is possible to solve the problem of discrepancy in the contents of the voice service configuration information without adding new functions to the mobile station 1. The mobile station 1 only needs to deactivate the ISR state of itself according to the normal ISR operation specified in the current 3GPP specifications.

Figure 6:
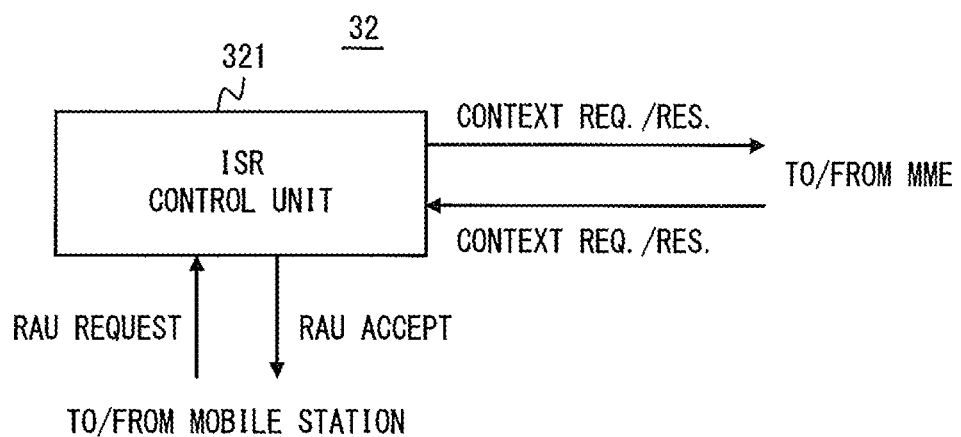
FIG. 6 is a block diagram showing a configuration example of SGSN according to the second embodiment.

FIG. 6 is a block diagram showing a configuration example of the SGSN 32 according to this embodiment.

Note that FIG. 6 shows only the major components related to the location registration procedure, the ISR, and the update of the voice service configuration information according to this embodiment. Further, although not shown, the MME 31 may include an ISR control unit that is the same as an ISR control unit 321 in FIG. 6.

The ISR control unit 321 performs signalling necessary to start the ISR with the mobility management node (e.g., the MME 31) of another RAT. Further, the ISR control unit 321 performs signalling necessary to start the ISR with a transfer node such as an S-GW and with a subscriber information server such as an HSS.

Further, the ISR control unit 321 sends a location registration response (i.e., RAU accept) indicating "ISR deactivated" to the mobile station 1 in response to receiving, from the mobile station 1 when the ISR is activated, a location registration request (i.e., RAU request) indicating the update of the voice service configuration information stored in the mobile station 1.

Figure 7:
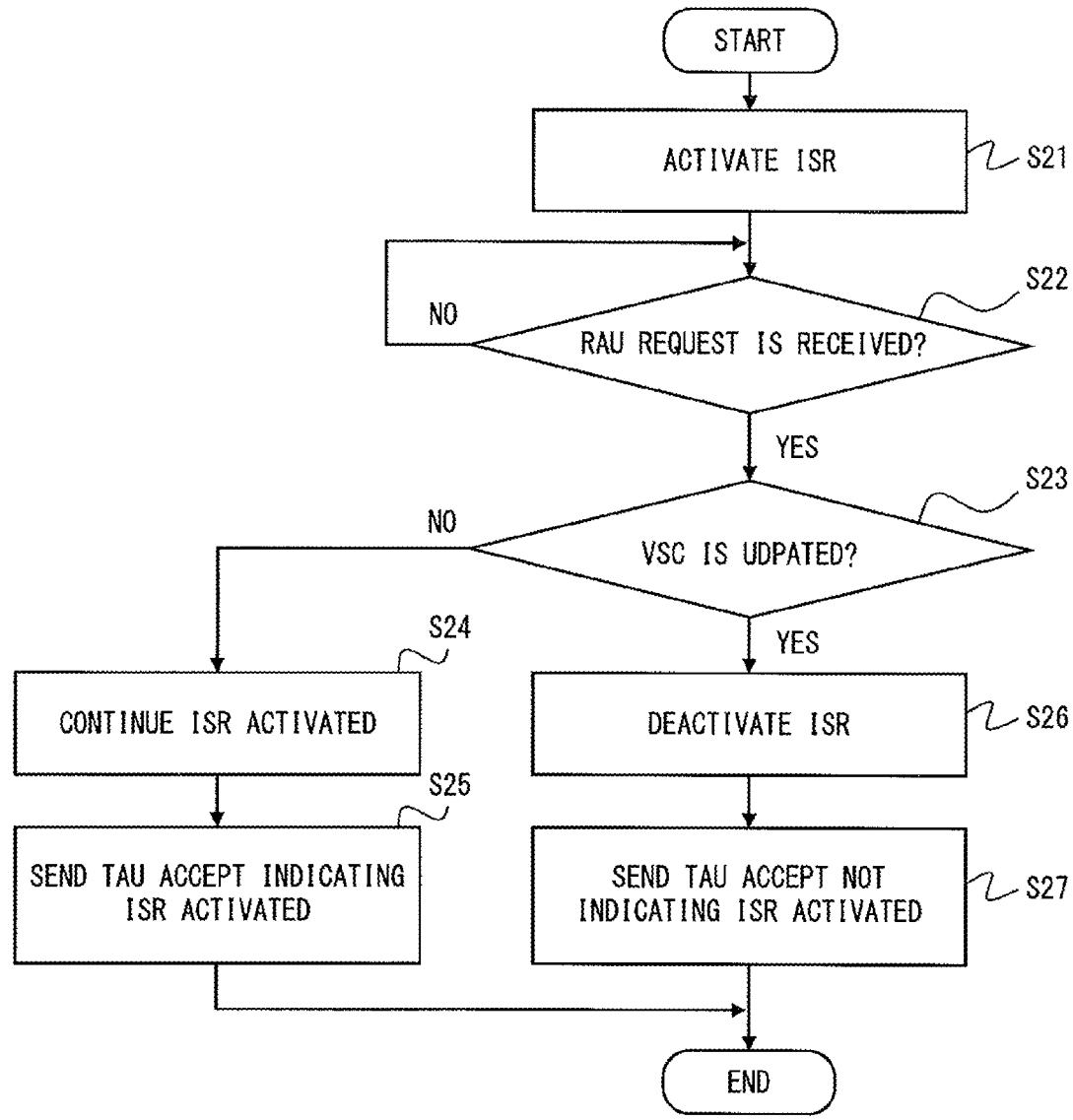
FIG. 7 is a flowchart showing an operation example of SGSN when receiving a RAU request according to the second embodiment.

FIG. 7 is a flowchart showing an example of the operation of the ISR control unit 321. The procedure of FIG. 7 is initiated when the ISR is activated (Step S21). In Step S22, the ISR control unit 321 determines whether a RAU request is received or not. When the RAU request is received, the ISR control unit 321 determines whether the RAU request indicates the update of the voice service configuration information (VSC) or not (Step S23).

When the RAU request does not indicate the update of the voice service configuration information (VSC), the ISR control unit 321 continues the ISR activated state and sends a RAU accept indicating "ISR activated" to the mobile station 1 which sent the RAU request (Steps S24 and S25). The case where the RAU request does not indicate the update of the voice service configuration information (VSC) is, for example, when the received RAU request is a normal periodical RAU request.

On the other hand, when the RAU request indicates the update of the voice service configuration information (VSC), the ISR control unit 321 determines to deactivate the ISR and sends a RAU accept not indicating "ISR activated" to the mobile station 1 which sent the RAU request (Steps S26 and S27).

Third Embodiment

The first embodiment describes two examples of the scheme that the updated content of the voice service configuration information in the mobile station 1 is synchronized between the MME 31 and the SGSN 32. For the example 1, an illustrative sequence is shown in FIG. 3 in the first embodiment. In the third embodiment, an illustrative sequence for the example 2 is described. Note that the configuration of the mobile communication system according to the third embodiment may be the same as the configuration example shown in FIG. 1.

Figure 8:
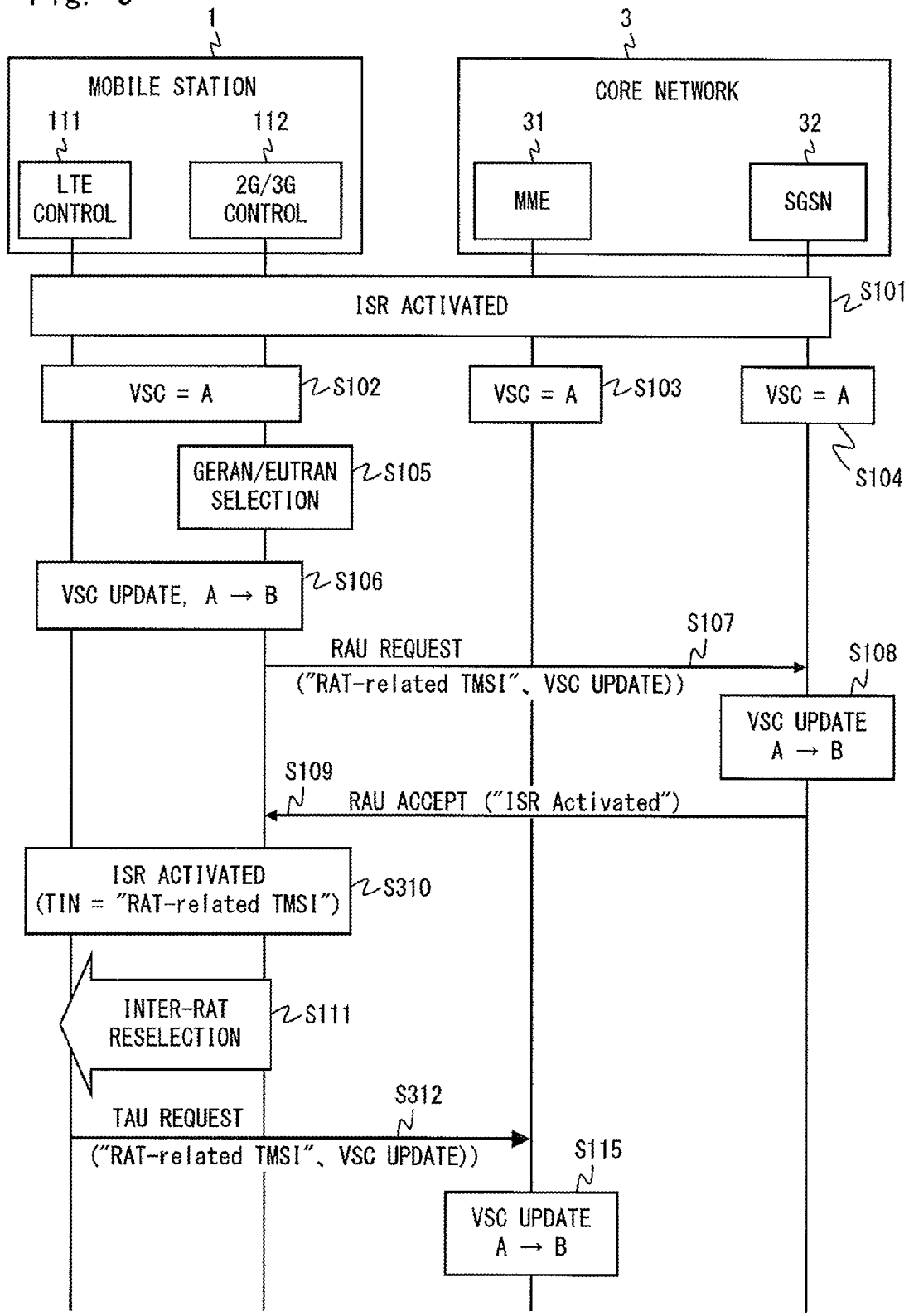
FIG. 8 is a sequence chart showing a relationship between update of voice service configuration information VSC and location registration procedure when the ISR is activated according to a third embodiment.

FIG. 8 is a sequence chart showing one example of the procedure to achieve synchronization of the voice service configuration information VSC updated in the mobile station 1 between the MME 31 and the SGSN 32. FIG. 8 is different from FIG. 3 in Steps S310 and S312.

The example of FIG. 8 corresponds to the case where the mobile station 1 informs neither the MME 31 nor the SGSN 32 about ISR deactivation. Thus, in Step S310, the mobile station 1 does not perform an explicit local ISR deactivation. Specifically, the mobile station 1 (i.e., the communication control unit 11) maintains the TIM as "RAT-related TMSI" corresponding to ISR activated. This is for the purpose of not informing the MME 31 about ISR deactivation in the later step S312.

However, the mobile station 1 (i.e., the communication control unit 11) memorizes that the voice service configuration information VSC has been updated (in Step S106) but another RAT (i.e., the MME 31) related to the ISR has not been notified of the update. Specifically, while the mobile station 1 (i.e., the communication control unit 11) does not perform explicit ISR deactivation that triggers a notification to the network (i.e. the MME 31 and the SGSN 32), it performs implicit ISR deactivation that does not trigger a notification to the network. Thus, the communication control unit 11 (i.e., the LTE control unit 111) sends a TAU request to the MME 31 corresponding to the E-UTRAN 21 to which the mobile station 1 moves in Step S312. This TAU request contains a notification about the update of the voice service configuration information VSC, just like the RAU request in Step S107.

In the example shown in FIG. 8, the mobile station 1 does not need to inform the network (i.e., the MME 31 and the SGSN 32) about ISR deactivation. Further, in the example shown in FIG. 8, the MME 31 and the SGSN 32 can synchronize the updated content of the voice service configuration information in the mobile station 1 with each other without signalling for context resynchronization.

Other Embodiments

In the first to third embodiments, a combined system of 3GPP UMTS and EPS (Evolved Packet System) is specifically described. However, the technical ideas described in those embodiments can be applied generally in a mobile communication system that accommodates a plurality of different RAN/RAT, allows reselection between different RAN/RAT and has similar scheme as the ISR for reducing signalling in location registration caused by the reselection. For example, the first to third embodiments can be applied also to a mobile communication system that accommodates 3GPP RAT and non-3GPP RAT (e.g., WiMAX, IEEE802.16m).

Further, the first to third embodiments can be combined as appropriate. Furthermore, the invention is not limited to the embodiments described above, and it will be obvious that various modifications may be made therein without departing from the spirit and scope of the present invention described above.

This application is based upon and claims the benefit of priority from Japanese patent application No. 2012-14020, filed on Jan. 26, 2012, the disclosure of which is incorporated herein in its entirety by reference.

REFERENCE SIGNS LIST

1 MOBILE STATION
3 CORE NETWORK
10 RADIO COMMUNICATION UNIT
11 COMMUNICATION CONTROL UNIT
21 E-UTRAN (EVOLVED UNIVERSAL TERRESTRIAL RADIO ACCESS NETWORK)
22 GERAN (GSM EDGE RADIO ACCESS NETWORK)/UTRAN (UNIVERSAL TERRESTRIAL RADIO ACCESS NETWORK)
31 MME (MOBILITY MANAGEMENT ENTITY)
32 SGSN (SERVING GPRS SUPPORT NODE)
111 LTE (LONG TERM EVOLUTION) CONTROL UNIT
112 2G/3G CONTROL UNIT

321 ISR (IDLE MODE SIGNALLING REDUCTION) CONTROL UNIT

The invention claimed is:

1. A mobile station comprising:
a receiver configured to receive a RAU (Routing Area Update) ACCEPT message; and
a controller configured to set a TIN (Temporary Identity used in Next update) to "P-TMSI (Packet-Temporary Mobile Subscriber Identity)" in a case where (1) the mobile station has initiated a routing area update procedure due to a change in a "UE's (User Equipment) usage setting" or a "Voice domain preference for E-UTRAN (Evolved Universal Terrestrial Radio Access Network)," and (2) the RAU ACCEPT message contains an indication of ISR (Idle mode Signaling Reduction) being activated.

2. The mobile station according to claim 1, wherein the setting of the TIN to the "P-TMSI" identifies that the status of ISR activation in the mobile station is deactivated.

3. The mobile station according to claim 1, wherein the "UE's usage setting" indicates whether the mobile station behaves in a voice centric or data centric way.

4. The mobile station according to claim 1, wherein the "Voice domain preference for E-UTRAN" indicates whether the mobile station is configured as CS (Circuit Switched) Voice only, CS Voice preferred and IMS (IP Multimedia Subsystem) PS (Packet Switched) Voice as secondary, IMS PS Voice preferred and CS Voice as secondary, or IMS PS Voice only.

5. The mobile station according to claim 1, wherein the RAU ACCEPT message corresponds to the routing area update procedure initiated by the mobile station.

6. A mobile station comprising:
a receiver configured to receive a TAU (Tracking Area Update) ACCEPT message; and
a controller configured to set a TIN to "GUTI (Globally Unique Temporary Identity)" in a case where (1) the mobile station had initiated a tracking area update procedure due to a change in a "UE's (User Equipment) usage setting" or a "Voice domain preference for E-UTRAN (Evolved Universal Terrestrial Radio Access Network)," and (2) the TAU ACCEPT message contains an indication of ISR (Idle mode Signaling Reduction) being activated.

7. The mobile station according to claim 6, wherein the setting of the TIN to the "GUTI" identifies that the status of ISR activation in the mobile station is deactivated.

8. The mobile station according to claim 6, wherein the "UE's usage setting" indicates the whether the mobile station behaves in a voice centric or data centric way.

9. The mobile station according to claim 6, wherein the "Voice domain preference for E-UTRAN" indicates whether the mobile station is configured as CS (Circuit Switched) Voice only, CS Voice preferred and IMS (IP Multimedia Subsystem) PS (Packet Switched) Voice as secondary, IMS PS Voice preferred and CS Voice as secondary, or IMS PS Voice only.

10. The mobile station according to claim 6, wherein the TAU ACCEPT message corresponds to the tracking area update procedure initiated by the mobile station.

11. A method performed by a mobile station, the method comprising:
receiving a RAU (Routing Area Update) ACCEPT message; and
setting a TIN (Temporary Identity used in Next update) to "P-TMSI (Packet-Temporary Mobile Subscriber Identity)" in a case where (1) the mobile station has initiated a routing area update procedure due to a change in a "UE's (User Equipment) usage setting" or a "Voice domain preference for E-UTRAN (Evolved Universal Terrestrial Radio Access Network)," and (2) the RAU ACCEPT message contains an indication of ISR (Idle mode Signaling Reduction) being activated.

12. The method according to claim 11, wherein the setting of the TIN to the "P-TMSI" identifies that the status of ISR activation in the mobile station is deactivated.

13. The method according to claim 11, wherein the "UE's usage setting" indicates whether the mobile station behaves in a voice centric or data centric way.

14. The method according to claim 11, wherein the "Voice domain preference for E-UTRAN" indicates whether the mobile station is configured as CS (Circuit Switched) Voice only, CS Voice preferred and IMS (IP Multimedia Subsystem) PS (Packet Switched) Voice as secondary, IMS PS Voice preferred and CS Voice as secondary, or IMS PS Voice only.

15. The method according to claim 11, wherein the RAU ACCEPT message corresponds to the routing area update procedure initiated by the mobile station.

16. A method performed by a mobile station, the method comprising:
receiving a TAU (Tracking Area Update) ACCEPT message; and
setting a TIN to "GUTI (Globally Unique Temporary Identity)" in a case where (1) the mobile station had initiated a tracking area update procedure due to a change in a "UE's (User Equipment) usage setting" or a "Voice domain preference for E-UTRAN (Evolved Universal Terrestrial Radio Access Network)," and (2) the TAU ACCEPT message contains an indication of ISR (Idle mode Signaling Reduction) being activated.

17. The method according to claim 16, wherein the setting of the TIN to the "GUTI" identifies that the status of ISR activation in the mobile station is deactivated.

18. The method according to claim 16, wherein the "UE's usage setting" indicates the whether the mobile station behaves in a voice centric or data centric way.

19. The method according to claim 16, wherein the "Voice domain preference for E-UTRAN" indicates whether the mobile station is configured as CS (Circuit Switched) Voice only, CS Voice preferred and IMS (IP Multimedia Subsystem) PS (Packet Switched) Voice as secondary, IMS PS Voice preferred and CS Voice as secondary, or IMS PS Voice only.

20. The method according to claim 16, wherein the TAU ACCEPT message corresponds to the tracking area update procedure initiated by the mobile station.

* * * * *